United States Patent
Gradoz et al.

(10) Patent No.: US 7,555,886 B2
(45) Date of Patent: Jul. 7, 2009

(54) MATERIAL-GUIDING DEVICE

(75) Inventors: Bruno Gradoz, Champlitte (FR); Heinrich Tepe, Gray la Ville (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/860,605

(22) Filed: Sep. 25, 2007

(65) Prior Publication Data
US 2008/0120956 A1 May 29, 2008

(30) Foreign Application Priority Data
Nov. 28, 2006 (DE) .................... 10 2006 056 050

(51) Int. Cl.
*A01D 45/02* (2006.01)
*A01D 34/00* (2006.01)

(52) U.S. Cl. .......................... 56/119; 56/17.3; 56/17.4

(58) Field of Classification Search ................ 56/192, 56/14.3, 17.3, 17.4, 119, DIG. 5
See application file for complete search history.

(56) References Cited

U.S. PATENT DOCUMENTS

| 3,092,946 | A | * | 6/1963 | Mathews | 56/14.9 |
| 4,233,803 | A | * | 11/1980 | Davis et al. | 56/14.9 |
| 4,799,352 | A | * | 1/1989 | Amstutz | 56/364 |
| 5,966,913 | A | * | 10/1999 | Neuerburg | 56/16.4 R |
| 7,337,599 | B2 | * | 3/2008 | Wilhelm | 56/16.4 R |
| 2007/0068130 | A1 | * | 3/2007 | Wilhelm | 56/192 |

FOREIGN PATENT DOCUMENTS

| EP | 1 008 290 | 6/2000 |
| WO | WO 2004/105462 | 12/2004 |

* cited by examiner

*Primary Examiner*—Thomas B Will
*Assistant Examiner*—Joan D Misa

(57) ABSTRACT

A material-guiding device in a mower-conditioner surrounds an upper front region of a crop processing rotor and is composed of an upstream-situated portion and a downstream-situated portion. The downstream-situated portion is adjustable relative to the upstream situated portion and is connected thereto such that the adjustment of the upstream-situated portion simultaneously leads to an adjustment of the downstream-situated portion, such that an adjustable angle α present between the two portions is maintained and thus a uniform material flow is enabled.

3 Claims, 2 Drawing Sheets

ABSTRACT(57)

MATERIAL-GUIDING DEVICE

FIELD OF THE INVENTION

The invention relates to a material-guiding device in an agricultural apparatus and to a mower-conditioner.

BACKGROUND OF THE INVENTION

EP 1008 290 discloses a conditioner-tedder having a conditioning plate, which regionally surrounds a conditioning rotor, and a swath plate, with which the discharged material flow can be diverted onto the ground and thus be more narrowly or more widely deposited. When the conditioning plate is adjusted, the direction of discharge onto the swath plate also changes, which latter must then be readjusted accordingly.

From WO A1 2004/105462, a comparable mowing and processing apparatus is known, in which the conditioning plate is followed by a plate which is either pressed under spring force against the conditioning plate and remains against the latter even when it is adjusted, at the same time adjusting in inclination, or which serves as a swath plate and remains in a single position irrespective of the adjustment of the conditioning plate.

The problem on which the invention is founded can be seen in the fact that an adjustment of the conditioning plate has an effect upon the swath plate.

SUMMARY OF THE INVENTION

According to the present invention, there is provided a mower-conditioner including a material guiding device including upstream- and downstream-situated portions which are each adjustable, with the downstream situated portion being adjusted jointly with the upstream portion such that a relative position between the two portions remains substantially constant.

In this way, the position of the downstream-situated portion, for example a swath plate, can be constantly adapted to the change in the upstream-situated portion, for example a conditioning plate, such that the transition, for example an angle, a distance and the like, can be altered as little as possible and the material flow is uniformly conveyed. The joint adjustment can be realized, for example, by a mechanical or hydraulic linkage or by a rigid, albeit adjustable, connection. The portions can be configured as a plate, a rake, rollers or the like.

If the one portion is directly connected to the other portion and moves with this, or if both portions are attached to a joint carrier, the position of which changes with the adjustment of the one portion, a joint adjustment of the two portions is likewise realized.

The effect upon the material flow can be altered if the portions are themselves adjustable, in which case they can also adopt a different spatial relationship relative to each other. The swath width and/or conditioning effect can thus be altered.

A manual actuating device for the adjustment of the portions can include levers, cranks, linkages and the like; a motor-operated actuating device can use electric or hydraulic motors, which are activated by an operator or by means of a control device in dependence on harvesting parameters, presets etc. If the actuating device(s) is/are located on the carrier, nothing changes in terms of their spatial relationship to the portions when adjustment takes place; alternatively, the actuating devices can be fitted separately from the housing and be connected to the portions via Bowden cables, lines or the like.

If an axis about which the carrier is pivotable, and an axis about which the downstream-situated portion is pivotably mounted on the carrier, are directly adjacent, the least possible change in the transition between the two portions occurs.

Since the material flow guidance in a mower-conditioner is critical to the material being nicely deposited, it is of great advantage to provide an appropriate material-guiding device close to the circumferential sub-region of a processing rotor. The material-guiding device according to the invention can also, however, be provided on other agricultural apparatuses, for instance on straw-choppers or on flail forage harvesters, i.e., anywhere where a rotor guides material and discharges it, guide plates being able to be provided, the portions of which act upon the material in the receiving and delivery region.

BRIEF DESCRIPTION OF THE DRAWINGS

In the drawing, an illustrative embodiment of the invention, which is described in greater detail below, is represented, wherein.

DESCRIPTION OF THE PREFERRED EMBODIMENT

Figure 1:
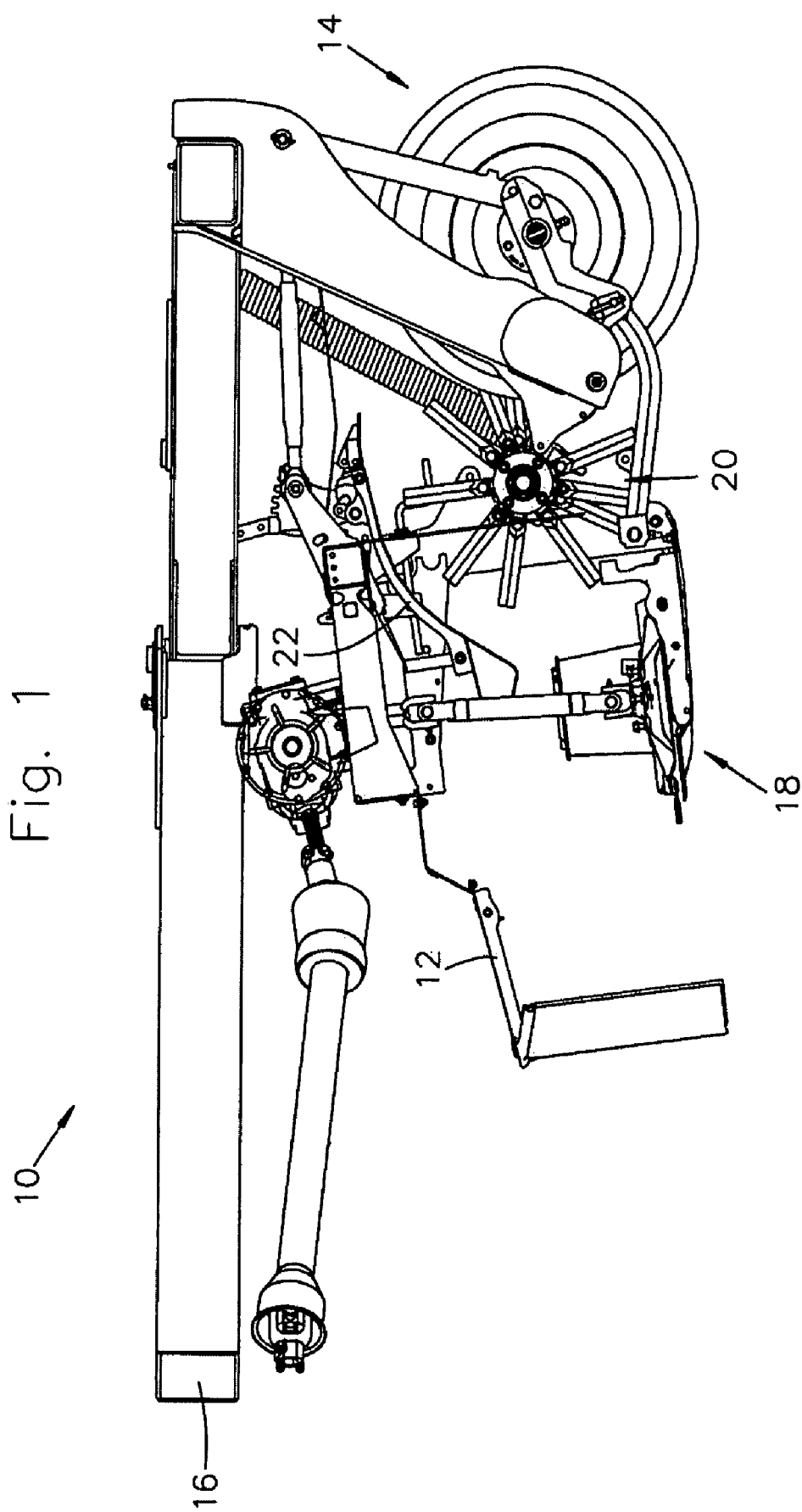
FIG. 1 is a diagrammatic left side view of an agricultural apparatus in the guise of a mower-conditioner having a material-guiding device.

An agricultural apparatus 10, shown in FIG. 1, is configured as a so-called mower-conditioner or tedder, which is known per se, and is provided with a housing 12, a chassis 14, a drawbar 16, a cutter bar 18, a rotor 20 acting as a processing rotor, and a material-guiding device 22.

Figure 2:
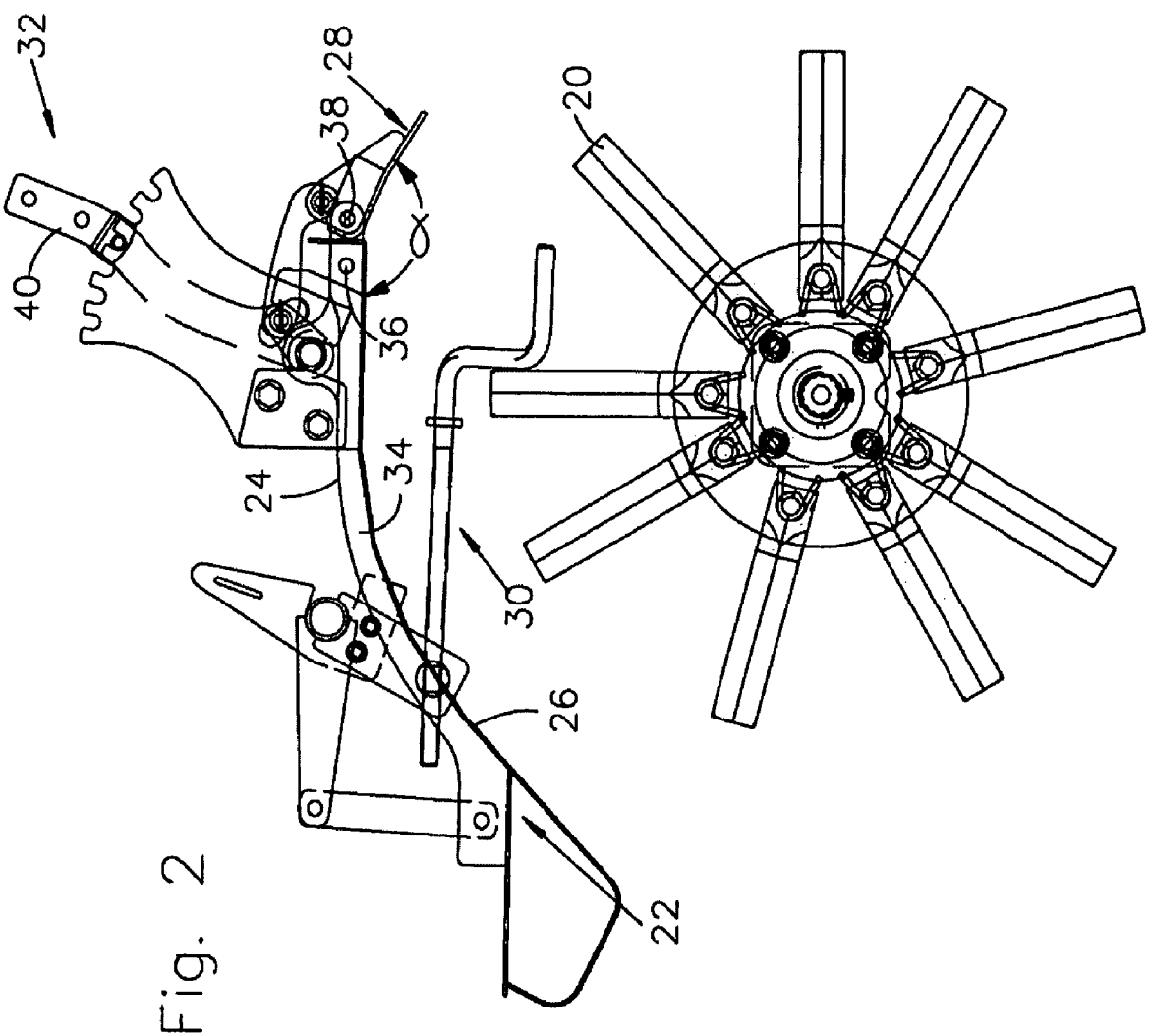
FIG. 2 shows the material-guiding device according to FIG. 1 with a number of details.

With reference to FIG. 2, it can be seen that the material guiding device 22 is located opposite the left upper quadrant of the rotor 20 and, in this illustrative embodiment, includes a carrier 24, an upstream-situated portion 26, a downstream-situated portion 28 and an adjustment arrangement for the guiding device 22 including a first actuating device 30 for the upstream-situated portion 26 and a second actuating device 32 for the downstream-situated portion 28.

The function of the material-guiding device 22 consists in firstly holding mown material in engagement with the rotor 20 and squeezing it into a gap between the rotor 20 and the first or upstream-situated portion 26, so that the non-homogeneous material rubs together and is prepared for the drying process. After this, the material, once it is able to detach itself from the rotor 20, is intended either to fly straight rearwardly, until it falls onto the ground, or until it engages, and is directed from, the second or downstream-situated portion 28 onto the ground. Both functions can be exercised more or less strongly.

The carrier 24 actually consists of a frame, having respectively an end web 34 and similar intermediate webs (not shown), which are rigidly connected to one another by means of cross struts. On their side facing the rotor 20, the end webs 34 are curved in accordance with a cylindrical path traced by outer ends of crop material engaging elements of the rotor 20, and extend over about ninety angular degrees. In the upper, rear end region of the end webs 34 can be found front and rear bearings 36 and 38, respectively. The front bearing 36 is at the same time located on the housing 12 and serves for the pivotable mounting of the carrier 24 on the housing. The rear bearing 38 serves for the vertical pivotable mounting of the downstream-situated portion 28 on the carrier 24. The axes of the bearings 36, 38 run parallel to each other and to the rotational axis of the rotor 20. The two bearings 36, 38 lie directly next to each other, in any event insofar as the actual circumstances permit, in order to accommodate the parts. The bearings 36, 38 can be configured as rods, hinges, screws, journals or the like.

The front, i.e., upstream-situated portion 26 is formed as a bent metal plate, along which the material flow can slide and which is fitted—screwed or welded—to the bottom side of the carrier 24. The downstream-situated edge of the upstream-situated portion 26 extends as far as the downstream-situated portion 28, yet continues to maintain a distance thereto so that the latter can still be pivoted. The portion 26 can also extend beyond the upstream-situated end of the carrier 24 and is there provided, as usual, with a skirt.

The rear, i.e., downstream-situated portion 28 is of substantially flat configuration and in this illustrative embodiment occupies only about one-fifth of the length of the upstream-situated portion 26 which directly adjoins the portion 28. Whilst the front portion 26 is pivotable only through a few degrees, the rear portion 28 can be pivoted through almost 90 degrees towards or away from the rotor 20. Between the two portions 26 and 28, an angle $\alpha$ is always obtained.

The first actuating device 30 is configured as a crank-linkage assembly, which is attached, preferably movably, on the one hand to the housing 12, and, on the other hand, to the carrier 24 and thus also to the front portion 26. As soon as the actuating device 30 is extended or retracted, for example, the position of the front portion 26 changes relative to the rotor 20. On the actuating device 30 or on the carrier 24, an indicator can be provided, so that an operator can tell how far the portion 26 is away from the cylindrical path traced by the radially outer ends of the crop material engaging elements of the rotor 20.

The second actuating device 32 is configured as a lever-linkage assembly and is disposed on the carrier 24, i.e., it moves with the latter. The actuating device 32 is equipped with a lever-latch mechanism 40, with which the second, downstream-situated portion 28 can be pivoted about the second bearing 38. The second portion 28 is held in a predetermined position, which can be recognized by the position of the lever-latch mechanism 40.

In principle, the first and/or the second actuating device 30 and/or 32 could also be located on the chassis 14 or its frame and act upon the carrier 24, or the portions 26, 28, via Bowden cables or the like.

After all this, the following working is obtained.

The upstream-situated portion 26 is located on the bottom side of the carrier 24, and the downstream-situated portion 28 is located with the second actuating device 32 on the rear end region of the carrier 24. Depending on the position of the lever-latch mechanism 40, a certain angle $\alpha$ is obtained between the two portions 26, 28. When the first actuating device 30 is actuated, the carrier 24, together with the two portions 26, 28, pivots about the front bearing 36, the angle $\alpha$, and thus the material flow characteristics, remaining unaltered.

Having described the preferred embodiment, it will become apparent that various modifications can be made without departing from the scope of the invention as defined in the accompanying claims.

The invention claimed is:

1. An agricultural apparatus including a crop engaging rotor creating a flow of crop material and including a crop material-guiding device for guiding the flow of crop material above said rotor, the crop material-guiding device comprising, with reference to a direction of crop flow through said apparatus, an upstream-situated portion extending from a location forwardly of said rotor to a location vertically above said rotor, and a downstream-situated portion penetrable into the flow of crop material, the improvement comprising: said downstream-situated portion extending rearwardly from said location vertically above said rotor; an adjustment arrangement coupled to said upstream-situated portion and to said downstream-situated portion of said crop material guiding device and being selectively operable for adjusting said downstream-situated portion relative to said upstream-situated portion so as to establish a selected positional relationship between said upstream- and downstream-situated portions, and for jointly adjusting said upstream-situated portion and said downstream-situated portion relative to said rotor without altering said selected positional relationship between said upstream- and downstream-situated portions; and said crop material guiding device including a carrier; said carrier having a downstream end region mounted for pivoting vertically about a fixed, horizontal, transverse first pivot axis; and said downstream-situated portion being mounted to said downstream end region of said carrier at a location downstream of said first pivot axis for vertical pivotal movement about a second pivot axis disposed parallel to said first pivot axis; and said adjustment arrangement being operable for selectively changing the angular relationship of said downstream-situated portion to said upstream-situated portion.

2. The agricultural apparatus, as defined in claim 1, wherein said adjustment arrangement includes first and second adjustment devices respectively connected for adjusting the upstream-situated portion and the downstream-situated portion of the material-guiding device.

3. An agricultural apparatus including a crop engaging rotor creating a flow of crop material and including a crop material-guiding device for guiding the flow of crop material above said rotor, the crop material-guiding device comprising, with reference to a direction of crop flow through said apparatus, an upstream-situated portion extending from a location forwardly of said rotor to a location vertically above said rotor, and a downstream-situated portion penetrable into the flow of crop material, the improvement comprising: said downstream-situated portion extending rearwardly from said location vertically above said rotor; an adjustment arrangement including first and second manually operated adjustment devices respectively coupled to said upstream-situated portion and to said downstream-situated portion of said crop material guiding device and being selectively operable for adjusting said downstream-situated portion relative to said upstream-situated portion so as to establish a selected positional relationship between said upstream- and downstream-situated portions, and for jointly adjusting said upstream-situated portion and said downstream-situated portion relative to said rotor without altering said selected positional relationship between said upstream- and downstream-situated portions; and said crop material guiding device includes a carrier; said carrier having a downstream end region mounted for pivoting vertically about a fixed, horizontal, transverse first pivot axis; and said downstream-situated portion being mounted to said downstream end region of said carrier at a location downstream of said first pivot axis for vertical pivotal movement about a second pivot axis disposed parallel to said first pivot axis; and said adjustment arrangement being operable for selectively changing the angular relationship of said downstream-situated portion to said upstream-situated portion; and said second adjustment device being mounted on said carrier.

* * * * *